United States Patent [19]
Kajioka et al.

[11] Patent Number: 5,482,525
[45] Date of Patent: Jan. 9, 1996

[54] METHOD OF PRODUCING ELLIPTIC CORE TYPE POLARIZATION-MAINTAINING OPTICAL FIBER

[75] Inventors: Hiroshi Kajioka; Kohdo Yamada; Masashi Nakamura; Kazuya Murakami; Yuuetsu Takuma, all of Hitachi, Japan

[73] Assignee: Hitachi Cable Limited, Tokyo, Japan

[21] Appl. No.: 68,645

[22] Filed: May 28, 1993

Related U.S. Application Data

[62] Division of Ser. No. 358,308, May 26, 1989, abandoned.

[30] Foreign Application Priority Data

May 27, 1988 [JP] Japan .................. 63-128498
Dec. 8, 1988 [JP] Japan .................. 63-308896

[51] Int. Cl.[6] ........................... C03B 37/023
[52] U.S. Cl. .................. 65/398; 65/31; 65/416; 65/403
[58] Field of Search ............ 65/2, 3.11, 3.12, 65/31

[56] References Cited

U.S. PATENT DOCUMENTS

| | | | |
|---|---|---|---|
| 4,274,854 | 6/1981 | Pleibel et al. ............... | 65/2 |
| 4,494,969 | 1/1985 | Bhagavatula ............... | 65/3.12 |
| 4,578,097 | 3/1986 | Berkey ....................... | 65/3.11 |
| 4,859,223 | 8/1989 | Kajioka et al. ............. | 65/3.12 |
| 4,986,939 | 1/1991 | Hoffman .................... | 65/3.11 X |

*Primary Examiner*—Robert L. Lindsay
*Attorney, Agent, or Firm*—Dykema Gossett

[57] ABSTRACT

A method of producing an elliptic core type polarization-maintaining optical fiber comprises the steps of providing a glass rod comprising a cladding glass layer around the periphery of a core glass layer, the cladding glass layer having a softening point higher than the softening point of the core glass layer, removing two side surface portions of the glass rod by machining along the axial direction of the glass rod to form a machined rod noncircular in cross section, outside depositing fine silica glass particles on the periphery of the machined rod, followed by sintering to provide a support glass layer having a softening point higher than the softening point of the cladding glass layer, and drawing the thus obtained glass rod body as an optical fiber preform. Since the portion for constituting the core of the optical fiber is formed by machining, the core is permitted to have a high ellipticity. An optical fiber with the desired size and birefringence index is obtained by regulating the conditions of production.

8 Claims, 11 Drawing Sheets

VAD

SINTERING

GRINDING & POLISHING

OUTSIDE DEPOSITION

SINTERING

FIG. 10(a) VAD

FIG. 10(b) SINTERING

FIG. 10(c) GRINDING & POLISHING

FIG. 10(d) OUTSIDE DEPOSITION

FIG. 10(e) SINTERING

METHOD OF PRODUCING ELLIPTIC CORE TYPE POLARIZATION-MAINTAINING OPTICAL FIBER

This is a divisional of application Ser. No. 07/358,308 filed on May 26, 1989 now abandoned.

BACKGROUND OF THE INVENTION

1. Technical Field

The present invention relates to a method of producing a polarization-maintaining optical fiber with a core having an elliptic cross-sectional shape.

2. Background Art

The use of a polarization-maintaining optical fiber as a transmission line for coherent light communication has been contemplated.

The polarization-maintaining optical fiber propagates light of $HE_{11}$ mode which is polarized in two major axial directions orthogonal to each other. In order to maintain the polarized state under disturbances such as bending, pressure, etc., the difference in propagation constant between two $HE_{11}$ modes is set to be large, thereby suppressing mode coupling. There are two typical methods of providing the propagation constant difference: one method <1> is by making the core noncircular in cross section, and the other <2> is by forming a stressed portion in the vicinity of the core.

FIG. 16 shows various types of polarization-maintaining optical fiber according to the prior art. In the figure, (1) is the panda type, (2) is the bow tie type, (3) shows the elliptic jacket type, (4) is the side tunnel type, (5) and (6) show the flat cladding type, and (7) is the elliptic core type. At present, the types in which the core is true circular in cross section and stressed ((1) to (6) in FIG. 16) are most commonly practiced, and the types of (5) and (6) in FIG. 16 in which the cladding is flat have been contemplated for improvement of coupling properties for optical integrated circuits.

The elliptic core type polarization-maintaining optical fiber ((7) in FIG. 16), based on the above-mentioned method <1>, is advantageous in that a large preform can be obtained and a long optical fiber with good polartization characteristic can be obtained. This type of optical fiber, however, is not so studied recently. The reason is that, with the elliptic core type, it is difficult to realize the noncircular cross-sectional shape on an industrial basis while maintaining the low-loss characteristics.

Figure 16A:
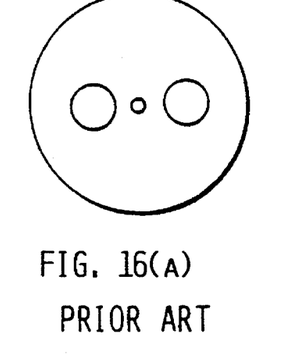
FIGS. 16(A)–(G) are a set of sectional views of various types of polarization-maintaining optical fiber according to the pior art.
Figure 16B:
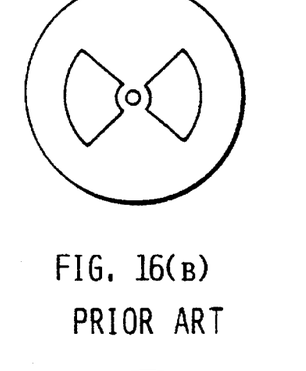
Figure 16C:
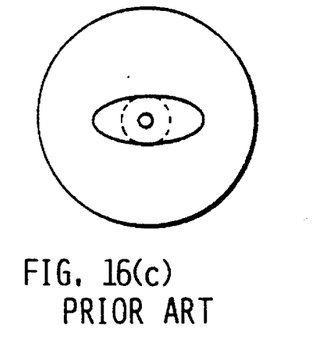
Figure 16D:
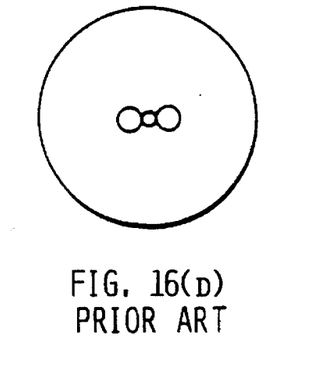
Figure 16E:
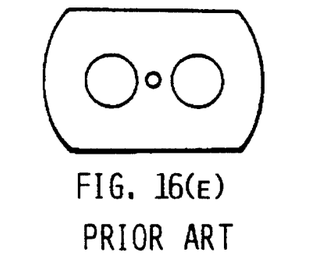
Figure 16F:
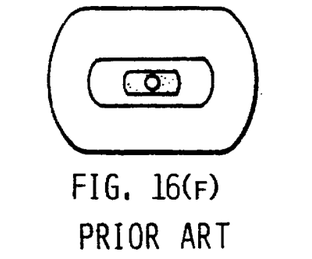
Figure 16G:
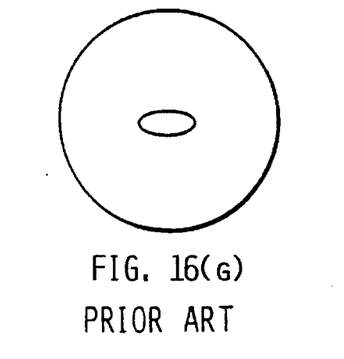

The polartization-maintaining optical fibers of (5) and (6) in FIGURE ]6 are disadvantageous in that, due to the neccessity for not only the step of providing the flat cross-sectional profile but the step of stressing the core, the production process is complicated, and elaborate equipment is required for the production. Therefore, it is impossible to obtain inexpensively these types of polarization-maintaining optical fiber.

SUMMARY OF THE INVENTION

It is an object of the present invention to provide a method of producing a polarization-maintaining optical fiber with excellent mass production performance by which it is possible to produce relatively easily an elliptic core type polarization-maintaining optical fiber.

It is another object of the present invention to provide a method of producing easily an elliptic core type polarization-maintaining optical fiber with a large length and good polarization characteristics through formation of a large-sized preform.

A method of producing a polartization-maintaining optical fiber according to a first aspect of the present invention comprises the steps of removing two lateral surface portions of a silica glass rod for constituting a core by machining along the axial direction of the silica glass rod, outside depositing a silica glass having a softening point higher than the softening point of the machined rod noncircular in cross section, on the periphery of the machined rod, in a cross-sectional shape similar to the cross-sectional shape of the machined rod, and drawing the thus obtained glass rod body with such a drawing force that the initial cross-sectional shape of the glass rod body is maintained. This method is particularly for obtaining an elliptic core type polarization-maintaining optical fiber suitable for coupling to an optical integrated circuit. In carrying out the production method, a glass rod for constituting a core is first produced by the vapor-phase axial deposition (VAD) process or the like. Next, the cross-sectional shape of the core rod is made to be noncircular by grinding, or, alternatively, a porous soot rod yet to be turned into the glass rod is cut, for example, by a cutter heated to a high temperature to obtain the noncircular cross-sectional shape. On the periphery of the thus obtained glass rod (machined rod), silica soot is externally deposited by the outside vapor deposition (OVD) process or the VAD process, followed by sintering and vitrification. Through the sintering and vitrification, the cross-sectional shape of the machined rod becomes noncircular due to the difference in viscosity, whereby an elliptic core is formed. The glass rod body thus obtained is subjected, if required, to shaping by grinding two side surface portions of the silica glass, to drawing or to other treatment. The shaping may be carried out by removing two side surface portions of the silica soot prior to sintering. Thereafter, the glass rod body, as an optical fiber preform, is drawn in a drawing furnace with such a drawing force that the initial noncircular cross-sectional shape of the glass rod body is maintained, to yield an optical fiber.

A method of producing an elliptic core type polarization-maintaining optical fiber according to a second aspect of the present invention comprises the steps of providing a glass rod comprising a cladding glass layer around the periphery of a core glass layer, the cladding glass layer having a softening point higher than the softening point of the core glass layer, removing two side surface portions of the glass rod by machining along the axial direction of the glass rod to form a machined rod noncircular in cross section, externally depositing fine particles of a silica glass on the periphery of the machined rod, followed by sintering to provide a support glass layer having a softening point higher than the softening point of the cladding glass layer, and drawing the thus obtained glass rod body as an optical fiber preform. This method is a method for obtaining an elliptic core type polarization-maintaining optical fiber of a three-layer structure comprising a core, a cladding and a support. The method, unlike the production method according to the first aspect of the invention, does not include special restrictions on the outer shape of the optical fiber. In the three-layer structure, the softening point varies from a lower to a higher value in the order of the core glass layer, the cladding glass layer and the support glass layer. Therefore, in the step of the sintering the fine silica glass particles externally deposited on the periphery of the machined rod, the cladding glass layer is melted and tends to assume a circular cross-sectional shape against the outer, support glass layer having a higher viscosity, when the core glass layer already melted is pulled together to become flat in cross section. Thus, both the core glass layer and the cladding glass layer become elliptic in cross section, with the respective major axes orthogonal to each other (FIGS. 2(e), 6 and 9). By drawing the glass rod body thus obtained, it is easy to realize an optical fiber having a cross-sectional structure similar to the cross-sectional structure of the glass rod body.

A method of producing an elliptic core type polarization-maintaining optical fiber according to a third aspect of the present invention resides in that, in the production method according to the second aspect of the invention, the specific refractive index difference $\Delta^+$ of the core glass layer with respect to the cladding glass layer, the specifice refractive index difference $\Delta^-$ of the cladding glass layer with respect to silica, the major diameter l of the machined rod, and the ellipticity $\epsilon_{clad}$ satisfy the following inequalities:

$$0.4\% \leq \Delta \times \leq 4\%$$
$$\Delta^- \leq -0.1\%$$
$$l_{clad} \leq 0.8.$$

Figure 3:
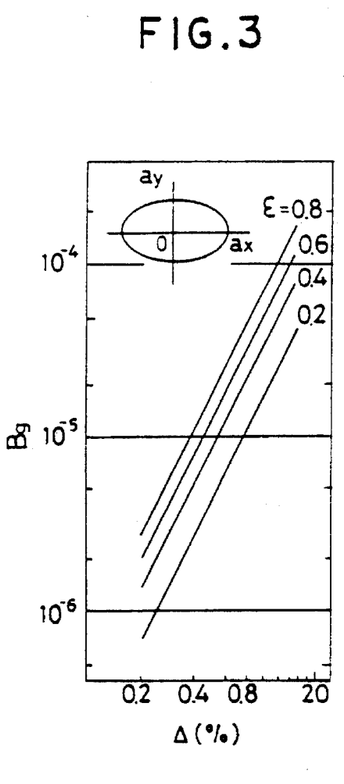
FIGS. 3 and 4 are characteristic charts respectively showing calculated values of Bg and Bs of an elliptic core type polarization-maintaining optical fiber.
Figure 4:
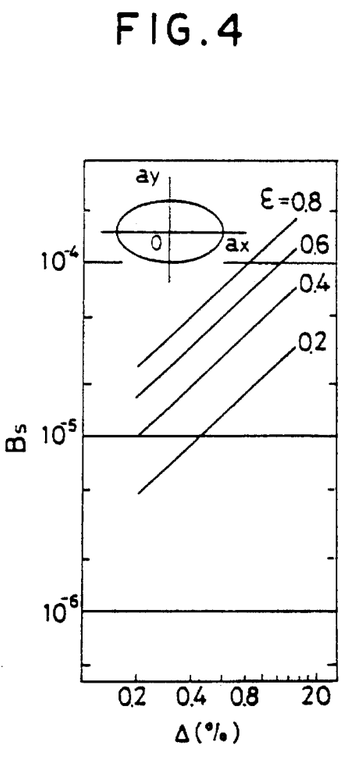
Figure 5:
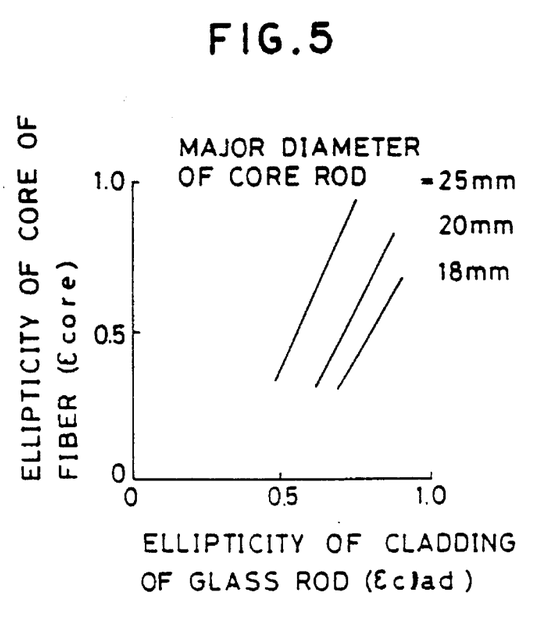
FIG. 5 is a characteristic chart showing the relationship between the ellipticity of the cladding of a ground glass rod and the ellipticity of the core of a fiber produced.

This production method is based on the consideration of the point that in the methods according to the first and second aspects of the invention, the production conditions for obtaining the mode birefringence index $B>5\times10^{-5}$ necessary for maintaining stably the polarization is not obtained, and it is difficult to obtain good extinction characteristics with good reproducibility. In general, the mode birefringence index B of an elliptic core type polarization-maintaining optical fiber is represented by the sum of guide-structure-related birefringence index Bg and stress-induced birefringence index Bs, which are known to be dependent on the specific refractivee index difference $\Delta$ and the ellipticity $\epsilon$ of the core, as shown respectively in FIGS. 3 and 4. To obtain a high mode birefringence B, therefore, it is necessary to limit the production conditions for controlling the ellipticity of the core. Thus, in the method of producing the optical fiber according to the third aspect of the invention, the amounts of $GeO_2$ and F added and the grinding quantity for the glass rod, which are important to the control of the deformation of the core into an elliptic form in cross section, are limited so as to enhance the yeild of production for obtaining the modal birefringence index $B>5\times10^{-5}$. More in detail, the deformation of the core glass layer into an elliptic form is induced by the viscosity difference between the rod glass and the outside deposited silica glass, as mentioned above; therefore, the visocity of the core rod and, hence, the amounts of $GeO_2$ and F added are important factors. When the amount of F added to the glass rod is small and the specific refractive index difference $\Delta^-$ of the cladding glass layer relative to silica is not less than −0.1%, the core glass layer is little deformed toward the elliptic form. When the amount of $GeO_2$ added to the cored is small and the specific refractive index difference $\Delta^+$ of the core glass layer relative to the cladding glass layer is not more than 0.4%, also, the core glass layer is not deformed toward the elliptic form. Though the modal birefringence index is higher as the amount of $GeO_2$ added is larger, the condition of $\Delta^+>4\%$ leads to higher possibility of cracking at the time of grinding the glass rod. As a result of test production of optical fibers by use of variously sized machined rods, namely, ground rods, it was found that the ellipticity $\epsilon_{core}$ of the core after formation of the optical fiber depends on the ellipticity $\epsilon_{clad}$ of the cladding glass layer of the ground rod and the size of the ground rod. In addition, if the minor diameter of the ground glass rod is not more than 5 mm, the glass rod is twisted at the time of sintering of the externally deposited silica soot, and the condition of $\epsilon_{clad}>0.8$ leads to the formation of foams at the interface between the externally deposited silica glass and the glass rod upon sintering. Furthermore, FIG. 5 shows that to obtain the condition of $B>5\times10^{-5}$, taking into account the Rayleigh scattering loss in the optical fiber, the ellipticity $\epsilon_{clad}$ is desirably at least 0.4. Thus, the ellipticity of the cladding glass layer should be in the range of $0.5\leq\epsilon_{clad}\leq0.8$, and the major diameter of the ground rod should be at least 18 mm. These are the production conditions for enabling the ellipticity of the core to be controlled with good reproducibility, thereby providing a polarization-maintaining optical fiber having a high modal birefringence index and a high extinction ratio. The ellipticity of the cladding glass layer and the major diameter of the glass rod mentioned above represent the shape of the rod immediately upon grinding, and the ground rod having such a shape may be drawn to control the outside diameter, before subjected to the next step.

Figure 6A:
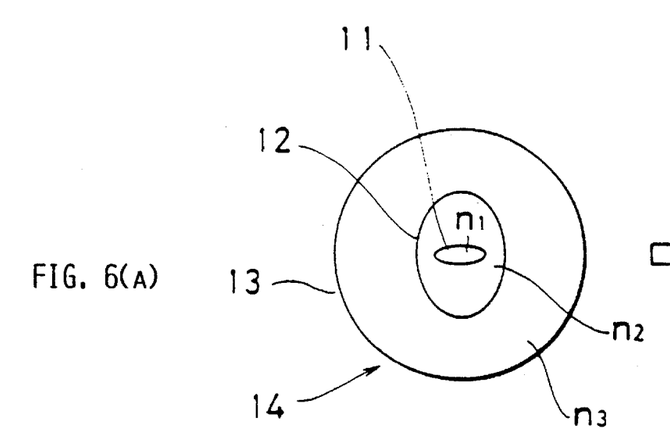
FIGS. 6(A)–(C) are illustrations of the profile of refractive index distribution of an elliptic core type polarization-maintaining optical fiber preform of a three-layer structure obtained in the second embodiment.
Figure 6B:
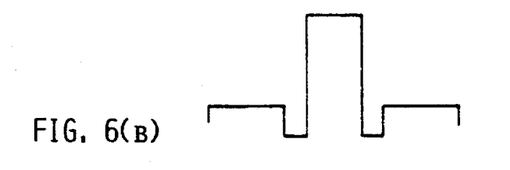
Figure 6C:
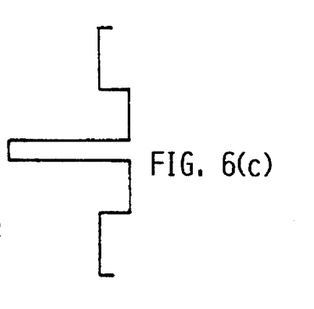

A method of producing an elliptic core type polarrization-maintaining optical fiber according to a fourth aspect of the present invention comprises the steps of providing a glass rod comprising a core glass layer containing germanium oxide and a fluorine-containing cladding glass layer surrounding the core glass layer, removing two side surface portions of the glass rod by machining along the axial direction of the glass rod to form a machined rod noncircular in cross section, depositing, on the periphery of the machined rod, fine glass particles of a glass composition having a softening point higher than the softening point of the cladding glass layer, followed by sintering to form a support glass layer, grinding away the support glass layer to produce a glass rod body circular in cross section, providing a glass layer of the same composition as the cladding glass layer, around the periphery of the glass rod body, and drawing the thus obtained glass rod body as an optical fiber preform. According to this production method, it is possible to obtain an optical fiber with a two-layer structure, and to achieve remarkable improvements in yield, loss and crosstalk. The above-mentioned production method according to the second aspect of the invention and the production method according to the fourth aspect of the invention will be explained in comparison. A typical example of the production method according to the second aspect of the invention is, for example, a method comprising the steps of grinding in parallel two side surface portions of a glass rod circular in cross section comprising a $GEO_2$- and F-doped core glass layer and an F-doped cladding glass layer to make the glass rod rectangular in cross section, then externally depositing fine silica glass particles on the periphery of the ground glass rod by the VAD process, and sintering the deposited glass particles to form a support glass layer, thereby obtaining an optical fiber preform. The elliptic cross-sectional shape of the core glass layer is produced by the viscosity differences between the core glass layer, the cladding glass layer and the support glass layer at the time of sintering the externally deposited fine glass particles. The elliptic core type polarization-maintaining optical fiber thus obtained has, as shown in FIG. 6, a three-layer structure comprising a core 11, a cladding 12 and a support 13, and the respective refractive indices $n_1$, $n_2$ and $n_3$ are in the relationship $n_1>n_3>n_2$, hence, a W-type structure. The W-type structure on the major diameter side of the elliptic core is different from that on the minor diameter side of the core, which leads to difficult designing of the cut-off wavelength and to a poor yield. In addition, due to the great difference in viscosity between the cladding 12 and the support 13 as well as the step of outside deposition on the rod having the rectangular cross section, there is a high possibility of mismatching at the cladding-support boundary, resulting in an increase in structure mismatching loss and deterioration of crosstalk characteristics. In consideration of these points, in the method of producing an elliptic core type polarization-maintaining optical fiber according to the fourth aspect of the invention, the support glass once provided on the periphery of the cladding glass layer for the purpose of deforming the core into an elliptic form is removed by grinding, thereby obtaining the matched cladding type of refractive index distribution. This refractive index distribution facilitates designing of the cut-off wavelength. Further, the cladding-support boundary which would casue a great structural mismatching is eleiminated, thereby improving the loss and crosstalk characteristics.

Figure 9:
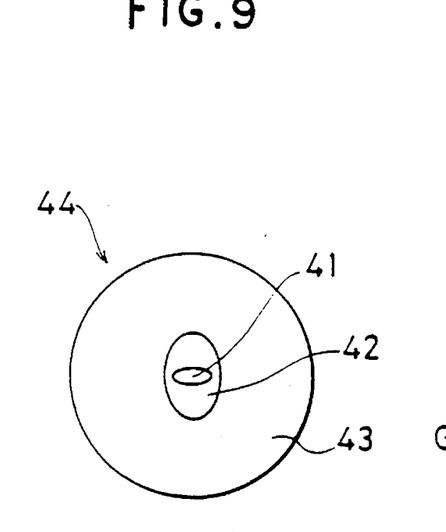
FIG. 9 is a sectional view of a polarization-maintaining optical fiber preform of a three-layer structure obtained by the production method shown in FIG. 10.
Figure 10A:
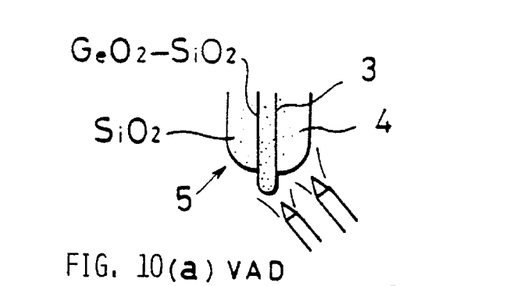
FIGS. 10(a)–(e) are sectional views respectively illustrating the production steps, similar to FIG. 2.
Figure 10B:
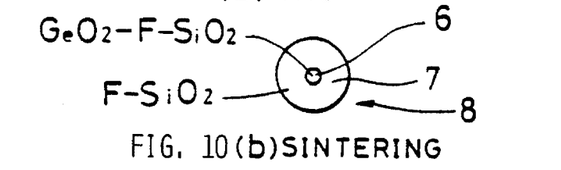
Figure 10C:
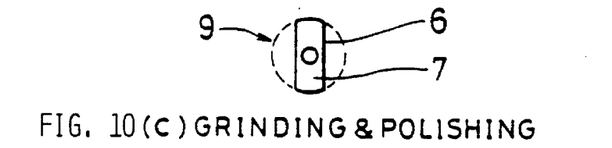
Figure 10D:
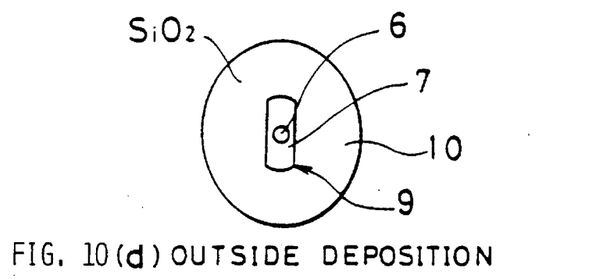
Figure 10E:
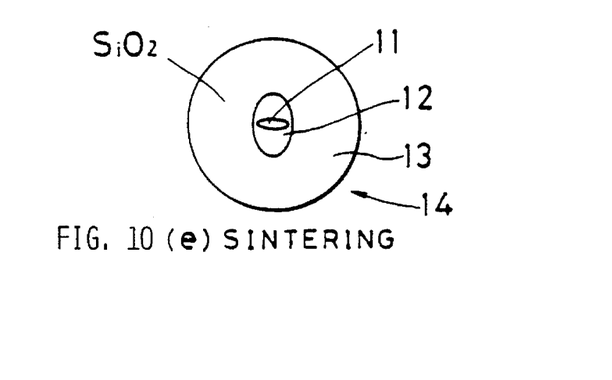

A method of producing an elliptic core type polartization-maintaining optical fiber according to a fifth aspect of the present invention comprises the steps of providing a first cladding glass layer around the periphery of a core glass layer, the first cladding glass layer having a softening point higher than the softening point of the core glass layer, removing two side surface portions of the glass rod by machining along the axial direction of the glass rod to form a machined rod noncircular in cross section, outside depositing fine silica glass particles on the periphery of the machined rod, followed by sintering to provide an intermediate cladding glass layer having a softening point higher than the softening point of the first cladding glass layer, outside depositing fine silica glass particles on the periphery of the intermediate cladding glass layer, followed by sintering to provide a second cladding glass layer having a softening point higher than the softening point of the intermediate cladding glass layer, and drawing the thus obtained glass rod body as an optical fiber preform. The elliptic core type polarization-maintaining optical fiber preform to be obtained by this production method has, for example as shown in FIG. 9, a three-layer structure comprising, from the center, an elliptic core 41, a first cladding 42 having an elliptic cross-sectional shape orthogonal to the elliptic cross-sectional shape of the core, and a second cladding 43 circular in cross-sectional shape at the outer periphery. In carrying out the production method, according to the above-mentioned method of the second aspect of the invention, as shown in FIG. 10, a glass rod 8 (FIG. 10(a), (b)) produced by the VAD process is mechanically ground and polished (FIGURE 10(c)). Then, on the periphery of the rectangular machined rod 9 thus obtained, fine $SiO_2$ glass particles 10 for constituting the second cladding is outside deposited one or more times as required (FIG. 10(d)), and is sintered (FIG. 10(e)) to obtain the elliptic core type of polarization-maintaing optical fiber preform 14. By utilizing the viscosity differences, namely, softening point differences between the glasses at the time of sintering after the outside deposition, the core 41 and the first cladding 42 assume elliptic cross-sectional shapes orthogonal to each other. Therefore, the softening point of each layer varies from a lower to a higher value in the order of the core 41, the first cladding 42 and the second cladding 43. Consequently, in the subsequent drawing step, though not shown, the glass layers are sequentially solidified in descending order of softening point, namely, in the order of the second cladding 43, the first cladding 42 and the core 41 as the preform is heated and drawn to be a fiber. In the above-mentioned method, however, there is a large difference between the softening point of the second cladding glass layer not containing dopants and the softening points of the first cladding and core glass layers containing dopants. Therefore, internal strains are generated at the time of solidification, which increases the Rayleigh scattering loss and structural mismatching loss, resulting in an increase in transmission loss. It is possible to reduce the Rayleigh scattering loss and structural mismatching loss by drawing the glass rod body at a lower drawing temperature and with a high tension. Under such conditions, however, the glass rod body is turned into a fiber by immoderate drawing, so that the preform is turned into the fiber without sufficient thermal recovery from defects such as flaws in the preform, and a satisfactory strength is not ensured. In view of these points, in the production method according to the fifth aspect of the invention, the intermediate glass layer having a softening point between the softening point of the first cladding glass layer and the softening point of the second cladding glass layer is provided between the first and the second cladding glass layer, whereby the internal strains generated at the time of drawing are reduced. Consequently, there is provided an elliptic core type of polarization-maintaining optical fiber having a low-loss and a low extinction ratio.

A method of producing an elliptic core type polarization-maintaining optical fiber according to a sixth aspect of the prevent invention comprises the steps of providing a glass rod circular in cross section comprising a core glass layer containing germanium oxide and a fluorine-containing fladding glass layer, removing two side surface portions of the glass rod by machining along the axial direction of the glass rod to form a machined rod noncircular in cross section, depositing fine silica glass particles for constituting a support on the periphery of the machined rod, followed by sintering to form a glass rod body, repeating the process from the machining step to the sintering step at least one time on the glass rod body, and drawing the thus obtained glass rod body as an optical fiber preform. This production method will be explained below in comparison with the production method according to the third aspect of the invention. In the above-mentioned method according to the third aspect of the invention, for example, two side surface portions of a glass rod circular in cross section comprising a $GeO_2$- and F-doped core glass layer and an F-doped cladding glass layer are ground in parallel to assume a rectangular cross-sectional shape, then fine silica glass particles are outside deposited on the periphery of the rectangular rod by the VAD process, and is sintered to obtain an elliptic core type polarization-maintaining optical fiber preform. The elliptic cross-sectional shape of the core glass layer is produced due to the viscosity difference between the glass rod and the outside deposited support glass layer at the time of sintering. The specific refractive index difference of the core glass layer relative to the cladding glass layer is 0.4 to 4%, whereas the specific refractive index difference of the support glass layer relative to the cladding glass layer is not more than 0.1%, the major diameter of the ground rod is at least 18 mm, and the ellipticity (1-(minor diameter)/(major diameter)) of the ground rod is 0.5 to 0.8. For the modal birefringence index of the elliptic core type polarization-mainitaning optical fiber to be at least $3\times10^{-4}$, it is necessary for the ellipticity of the core glass layer to be at least 0.8 where the specific refractive index difference between the core glass layer and the cladding glass layer is 1%. It has been impirically confirmed that the ellipticity of the core glass layer coincides with the ellipticity of the ground rod. If the specific refractive index difference between the core glass layer and the cladding glass layer is not less than 1%, the Rayleigh scattering loss increases, making it difficult to obtain a low loss optical fiber. In the present situation, the specific refractive index difference of the core glass layer relative to the cladding glass layer is set at about 1%, and the ellipticity of the core glass layer is set at 0.8. Due to the grinding to the proximity of the core glass layer, however, a structural mismatching loss is generated, resulting in an increase in loss by about 5/100 dB/km, as compared with the case of turing the glass preform into a single-mode optical fiber without grinding. Therefore, there has been the problem that the loss increases when the ellipticity is set to be not less than 0.8 so as to increase the modal birefringenec index. In view of this point, in the production method according to the sixth aspect of the invention, the step of grinding the glass rod and the step of sintering are carried out at least two times, thereby making it possible to eliminate the structural mismatching loss and to set the ellipticity at a value of not less than 0.8. Consequently, there is provided an elliptic core type polarization-maintaining optical fiber having a low loss and good polarization-maintaining characteristics.

BRIEF DESCRIPTION OF THE DRAWINGS

FIGS. 2(a)–(e) are sectional views respectively illustrating the steps for producing an elliptic core type polarization-maintaining optical fiber of a three-layer structure according to a second embodiment of the invention;

DESCRIPTION OF THE PREFERRED EMBODIMENTS

The preferred embodiments of the present invention will now be described below while referring to the drawings.
First embodiment:

FIG. 1 illustrates an example of the steps for producing a polartization-maintaining optical fiber according to the present invention, by which it is possible to realize a noncircular cross-sectional shape while maintaining low-loss characteristics.

Figure 1A:
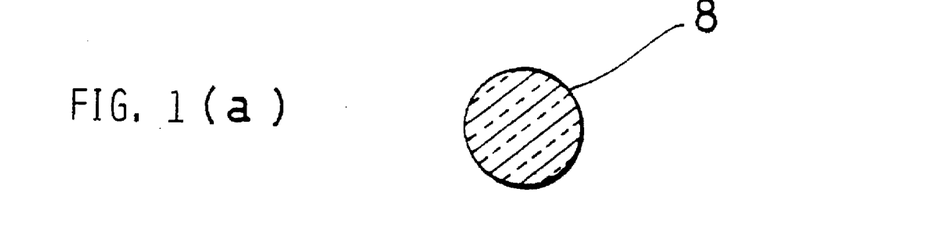
FIGS. 1(a)–(d) are sectional views respectively view illustrating the steps for producing an elliptic core type polarization-maintaining optical fiber according to a first embodiment of the present invention.
Figure 1B:
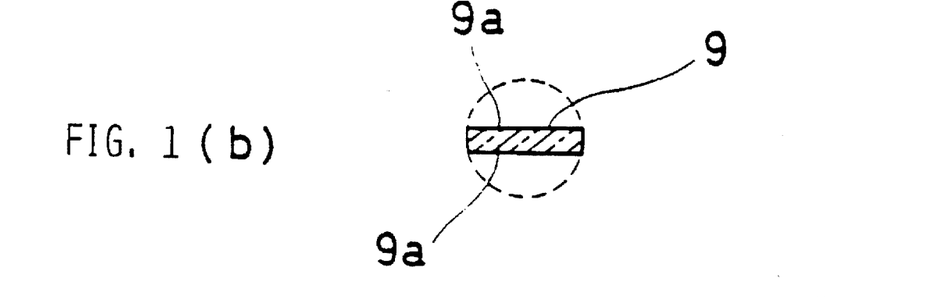
Figure 1C:
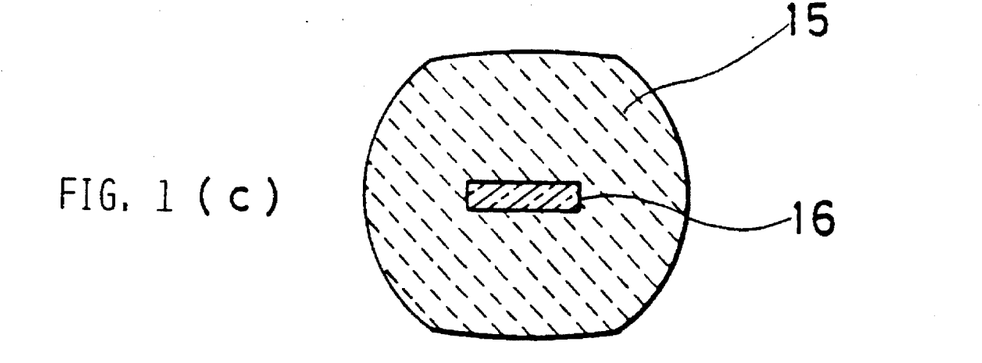

In FIG. 1(a), there is shown a glass rod 8 to become a core. The glass rod 8 comprises a silica glass doped with about 40 mol % of Ge, and is produced by the VAD process. Two side surface portions at opposite positions of the glass rod 8 are ground in the axial direction of the rod, as shown in FIG. 1(b), and the two side surfaces are polished to form a machined rod 9. Denoted by 9a and 9b are polished surfaces.

Next, fine particles, namely, so-called soot of silica glass is externally deposited on the machined rod 9 by the outside chemical vapor deposition (OCVD) process or the VAD process, and is vitrified. The silica glass 15 thus externally deposited is made to be a cladding (FIG. 1(c)). By the sintering and vitrifying step, the machined rod 9 as the central layer is made noncircular in cross section, due to the viscosity difference between the rod and the cladding glass, to be an elliptic core 16 nearly rectangular in cross section.

Figure 1D:
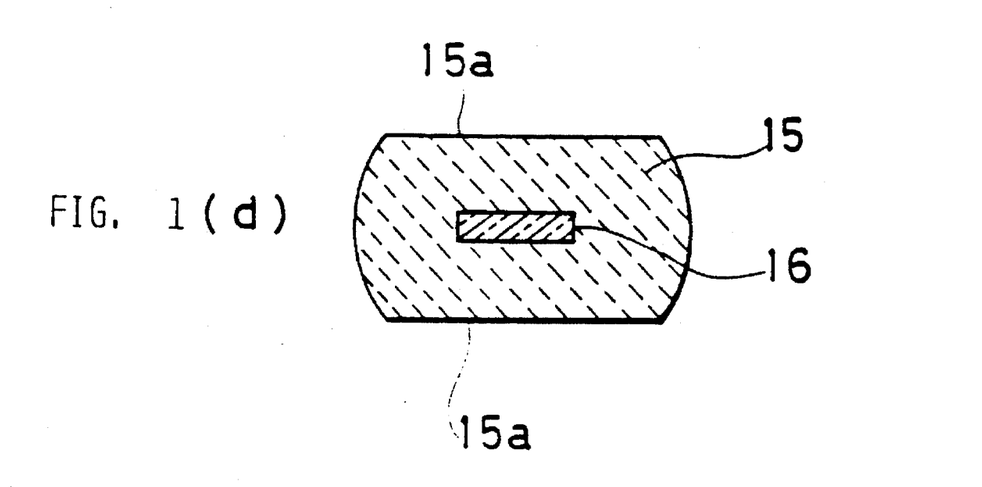

Then, two side surface portions of the externally deposited silica glass ]5 are ground and polished to as to assume substantially the analogous cross-sectional shape to the nearly rectangular, elliptic core 16 constituting the central layer, as shown in FIGURE 1(d). Thus, an optical fiber preform is obtained. Denoted by 15a and 15b are polished surfaces.

Subsequently, the optical fiber preform is drawn with a drawing force of 50 to 60 g while maintaining the initial shape, and is coated with a silicone, a ultraviolet-curing resin or the like, to produce an elliptic core type polarization-maintaining optical fiber yarn having a noncircular cross-sectional profile which is capable of being easily coupled to an optical integrated circuit. In the drawing, the outside diameter is controlled so that the fundamental mode satisfies the single-mode conditions.

Figure 2A:
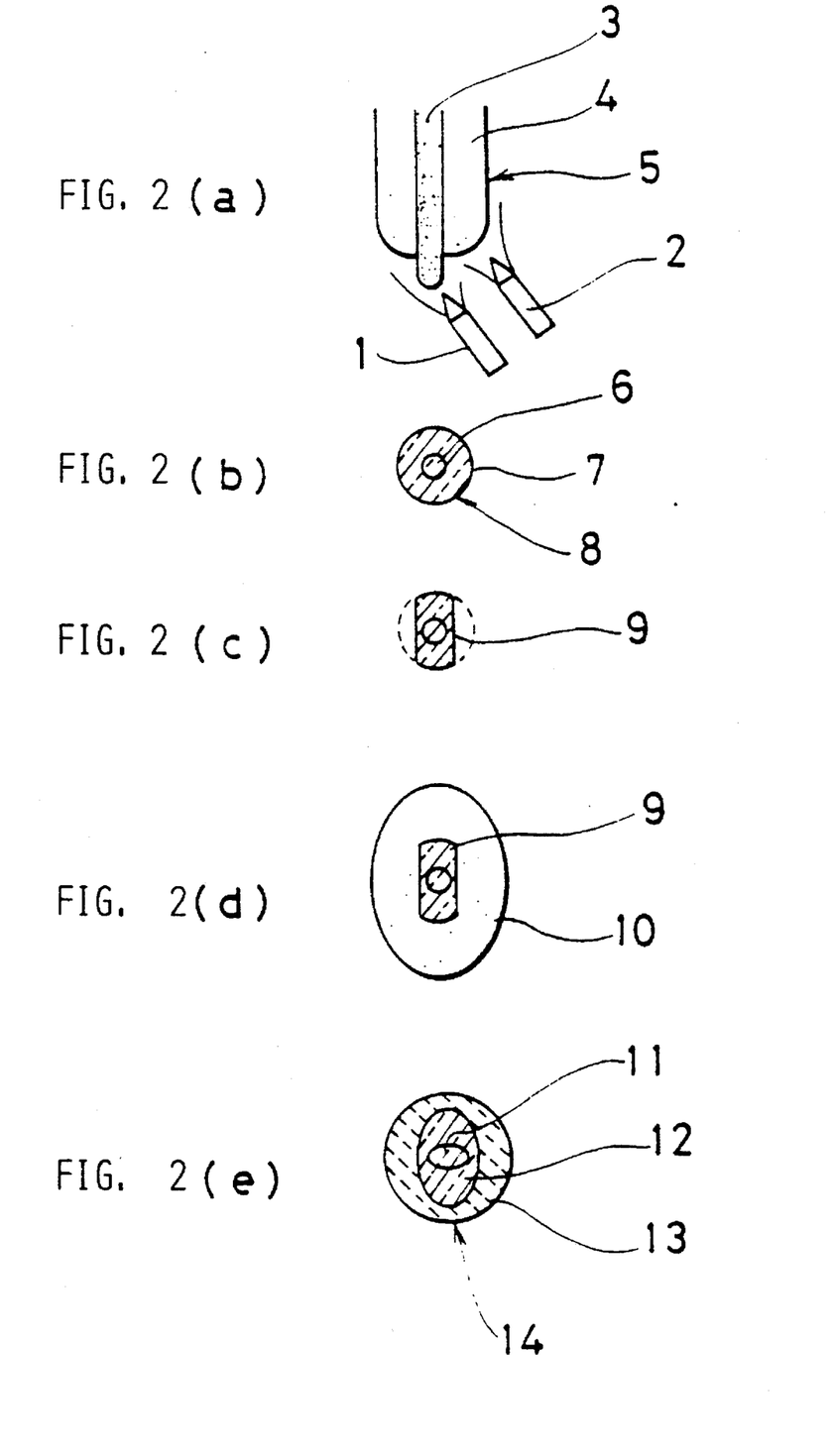

In this example, the externally deposited silica glass 15 may also contain a dopant such as F.
Second embodiment:

FIG. 2 illustrates an embodiment in which a glass rod comprising a core glass layer and a cladding glass layer higher in softening point than the core glass layer is used. The amounts of $GeO_2$ and F added and the grinding quantity for the glass rod, which are important to the control of deformation of the core glass layer into an elliptic form, are limited to thereby obtain a high modal refringence index.

In FIG. 2, $GeO_2$ and $SiO_2$ were supplied from a burner 1 for the core, whereas $SiO_2$ was supplied from a burner 2 for the cladding, and fine glass particles were deposited by the VAD process to form a porous glass rod body 5 comprising a core portion 3 and a cladding portion 4 (FIG. 2(a)). The addition of $GeO_2$ to the core portion 3 was so controlled to obtain a specific refractive index difference of 1.2%. Next, the porous glass rod body 5 was sintered and vitrified in a fluorine atmosphere, to obtain a glass rod 8 comprising a core glass layer 6 and a cladding glass layer 7 (FIG. 2(b)). The amount of F added was so controlled as to casue the specific refractive index difference of the cladding glass layer 7 relative to $SiO_2$ to be −0.3%. The ratio d of the thickness of the cladding glass layer to the radius of the core glass layer was set at δ=5. For a lower loss, it is desirable that δ≧3.

Further, the glass rod 8 was drawn to have a diameter of 25 mm, and two side portions of the cladding glass layer 7 were ground in parallel to the axial direction, and the ground surfaces were given a specular finish. After grinding, the machined rod 9 had a major diameter of 25 mm and a minor diameter of 8 mm (FIG. 2(c)). Thereafter, fine silica glass particles 10 for constituting a support were externally deposited on the periphery of the machined rod 9 by the VAD process (FIG. 2(d)), and subjected to sintering and vitrification (FIG. 2(e)). Thus, as shown in FIG. 2(e), an optical fiber preform 14 comprising a core 11, a cladding 12 and a support 13 was obtained. When the fine silica glass particles 10 were sintered, shrinking forces acted on the core glass layer 6 and the cladding glass layer 7, whereby the core 11 and the cladding 12 were made to assume elliptical cross-sectional shapes orthogonal to each other, and the ellipticity of the core 11 became 0.8.

The external deposition for forming the support 3 was carried out divisionally in two stages, to obtain a finished outside diameter of about 30 mm. It is preferable to carry out the external deposition divisionally in a plurality of stages, with the deopsition quantity per stage being reduced.

The optical fiber preform 14 (FIG. 6) was hot drawn to a fiber outside diameter of 125 μm to form a polarization-maintaining optical fiber of 40 km length. The optical fiber had three layers, namely, core, cladding and support layers with a structure corresponding to the structure of the preform, and the refractive indices $n_2$ and $n_3$ were in the relationship $n_1 > n_3 > n_2$, hence, the W-type structure. The optical fiber had a light loss of 0.25 dB/km at a wavelength of 1.55 μm, an extinction ratio of −35 dB/km, and a modal birefringence index of $2 \times 10^{-4}$. The modal birefringence B satisfies the initial target of $B > 5 \times 10^{-5}$.

Third embodiment:

Now, an example of production method for obtaining a polarization-maintaining optical fiber preform of the matched cladding type in index distribution (FIG. 7) will be explained while referring to FIG. 8.

Figure 8A:
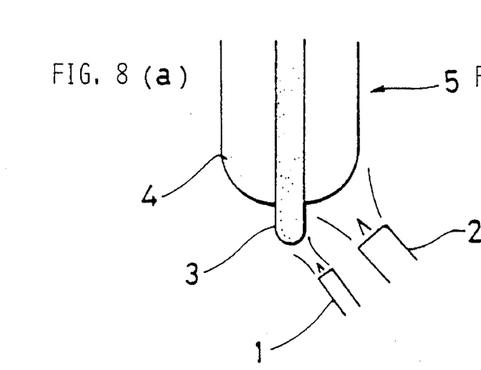
FIGS. 8(a)–(g) are sectional views respectively illustrating the steps for producing an elliptic core type polarization-maintaining optical fiber of a two-layer structure according to the third embodiment of the invention.

With supply of $GeO_2$ and $SiO_2$ from a burner 1 for the core and supply of $SiO_2$ from a burner 2 for the cladding, fine glass particles were deposited by the VAD process to produce a porous glass rod body 5 comprising a core portion 3 and a cladding portion 4 (FIG. 8(a)). Addition of $GeO_2$ to the core portion 3 was so controlled as to obtain a specific refractive index difference of 1.0%.

Figure 8B:
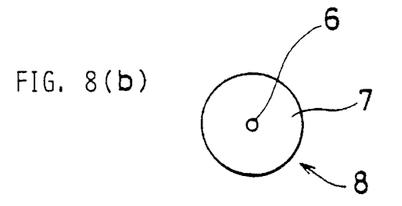

The porous glass rod body 5 was subjected to sintering and vitrification in a fluorine-containing atmosphere to obtain a glass rod 8 comprising a core glass layer 6 and a cladding glass layer 7 (FIG. 8(b)). The flow rate of fluorine was so controlled as to cause the specific refractive index difference of the cladding glass layer relative to $SiO_2$ to be −0.3%. The ratio of the diameter of the cladding glass layer to the diameter of the core glass layer was twelve.

Figure 8C:
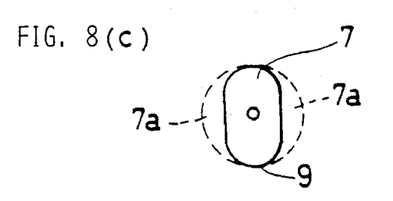

After the glass rod 8 was drawn to a diameter of 30 mm, two side portions 7a, 7b of the cladding glass layer 7 were mechanically ground in the axial direction, and the ground surfaces were subjected to polishing and fire-polishing (FIG. 8(c)). The minor diameter of the machined rod 9 after grinding was 70 mm.

In the grinding shown in FIG. 8(c), the edge portions generated may be rounded by chamfering to make the machined rod 9 oblong or elliptic in cross section.

Figure 8D:
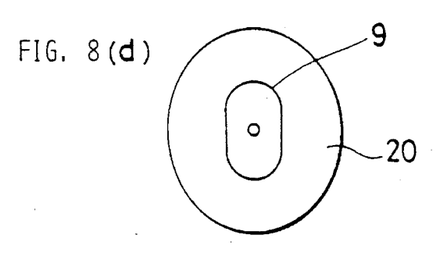
Figure 8E:
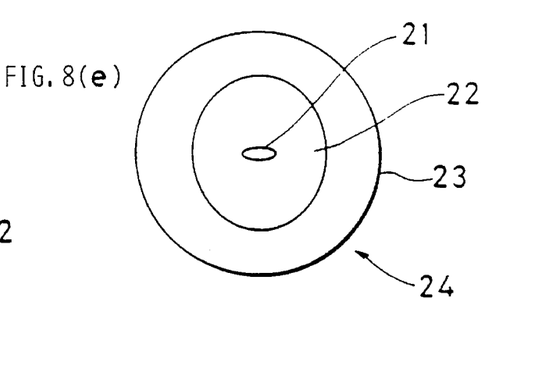

Fine $SiO_2$ glass particles 20 were externally deposited on the periphery of the machined rod 9 (FIG. 8(d)), and subjected to sintering and vitrification, to produce a glass rod body 24 of a three-layer structure comprising an elliptic core glass layer 21, an elliptic cladding glass layer 22, and a support glass layer 23 (FIG. 8 (e)).

Figure 8F:
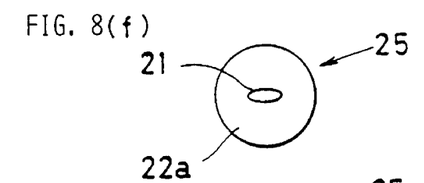

The glass rod body 24 was again ground in the circumferential direction to completely grind away the support portion 23, thereby producing a glass rod body 25 of a two-layer structure comprising an elliptic core glass layer 21 and a circular cladding glass layer 22a (FIG. 8(f)). The outside diameter of the glass rod body 25 became 15 mm.

Figure 8G:
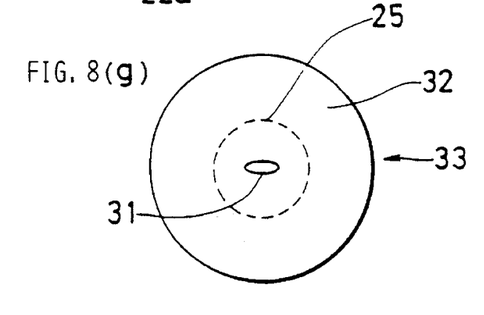

A glass layer of the same composition as the cladding glass layer 22a was provided on the glass rod body 25 by repeating the outside deposition of fine glass particles and sintering, to produce an optical fiber preform 33 of a two-layer structure comprising an elliptic core 31 and a circular cladding 32, such that the cut-off wavelength of an optical fiber after drawing would be 1.45 μm (FIG. 8(g)).

Figures 7A, 7C:
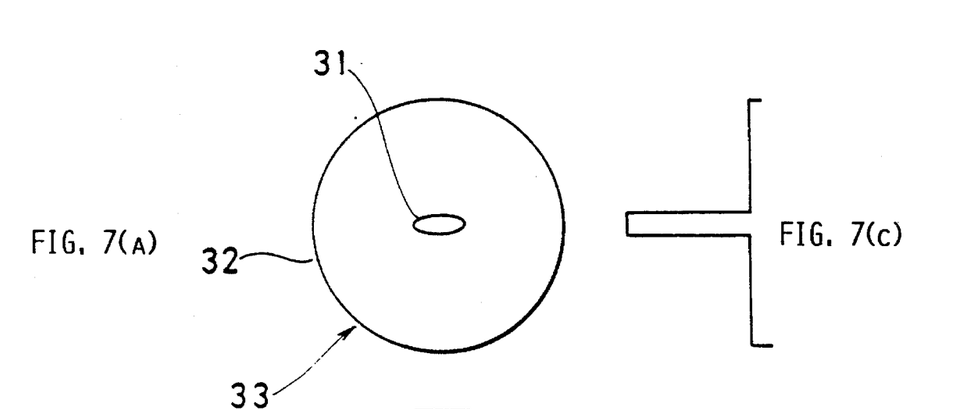
FIGS. 7(A)–(C) are illustrations of the profile of refractive index distribution of an elliptic-core type polarization-maintaining optical fiber preform obtained in a third embodiment of the invention.
Figure 7B:
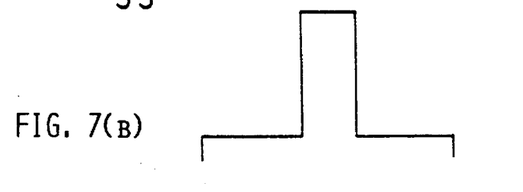

The optical fiber preform 33 (FIG. 7) was drawn to a fiber length of 10 km with a fiber outside diameter of 125 μm. The elliptic core type polarization-maintaining optical fiber thus obtained showed, upon evaluation of characteristics, a loss of 0.25 dB/km at a wavelength of 1.55 μm and a crosstalk of −20 dB.

As a modification of third embodiment, the steps (a) and (b) of FIG. 8 were repeated to produce a glass rod 8 with the ratio of the diameter of the cladding glass layer to the diameter of the core glass layer of about 40, and then the steps (c) to (f) of FIG. 8 were carried out. Upon the grinding step of FIG. 8(f), it was possible to provide the optical fiber preform 33 with such an outside diameter that the cut-off wavelength of the optical fiber after drawing would be 1.45 μm.

Machining of the cladding glass layer 7 (FIG. 8(c)) and removal of the support glass layer 23 (FIG. 8(f)) were carried out by grinding in the above embodiments, but the machining and the removal may be carried out by use of the corroding action of hydrofluoric acid, in place of grinding. The glass layer 32 externally deposited in FIG. 8(g) may have a glass composition different from the glass composition of the cladding glass layer 22a, as long as the refractive indices of the two glass layers are equal.

Though the glass composition of the core glass layer 21 was $GeO_2$—$SiO_2$—F in third embodiment, the composition may be $GeO_2$—$SiO_2$ and, further, may be doped with other dopant than F. Even in such a form, the elliptic core type polarization-maintaining optical fiber preform obtained has, as shown in FIG. 7, the two-layer structure comprising the elliptic core 31 and the cladding 32, which facilitates designing of the cut-off wavelength of the optical fiber and enhances the yield. In addition, it is possible to obtain an optical fiber preform with little structural mismatching and to achieve reductions in loss and crosstalk.

Fourth embodiment:

An optical fiber preform 44 in FIG. 9 is obtained by the production method shown in FIG. 10, similar to FIG. 2. The preform has a three-layer structure, similar to the strcture shown in FIG. 6, comprising a core 41, a frist cladding 42 and a second cladding 43, the softening temperature of each layer varying from a lower to a higher value in that order. In such an optical fiber preform 44, however, the difference between the softening temperature of glass of the second cladding 43 and the softening temperatures of glasses of the core 41 and the first cladding 42 is enlarged during the drawing step, leading to generation of internal strain at the time of solidification.

Figures 11A, 11C:
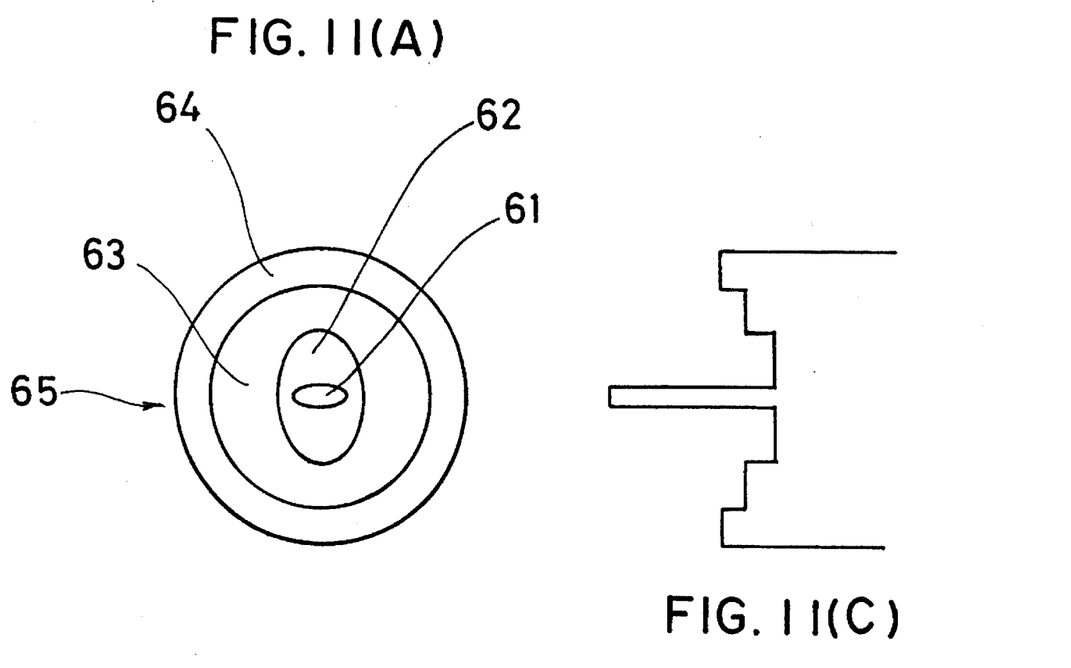
FIGS. 11(A)–(C) are illustrations of the profile of refractive index distribution of a polarization-maintaining optical fiber preform of a four-layer structure obtained by a fourth embodiment of the production method according to the invention.
Figure 11B:
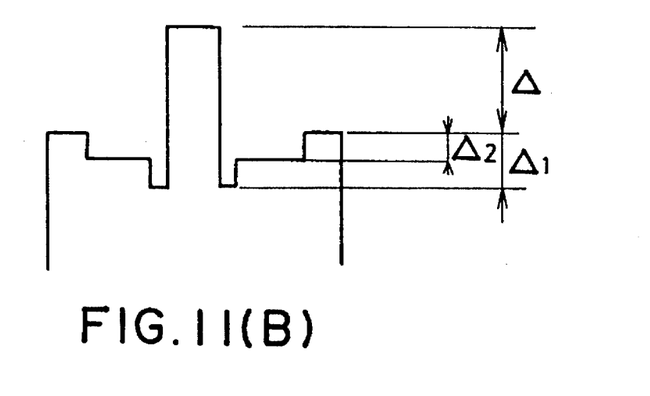

In view of the above, as shown in FIG. 11 or 4, an optical fiber preform is provided with an intermediate glass layer between the first cladding glass layer and the second cladding glass layer, the softening point of the intermediate layer being between the softening points of the first and second cladding glass layers.

FIG. 12 shows an embodiment of the production method for obtaining an optical fiber preform 65 (FIG. 11) having such a structure.

Figure 12A:
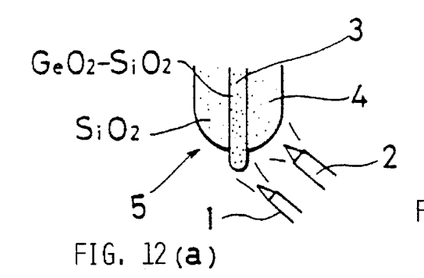
FIGS. 12(a)–(g) are sectional views respectively illustrating the steps for producing a polarization-maintaining optical fiber preform according to the fourth embodiment of the invention.
Figure 12B:
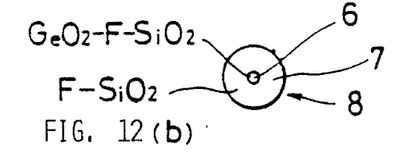
Figure 12C:
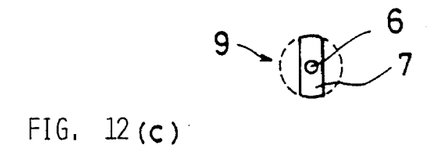
Figure 12D:
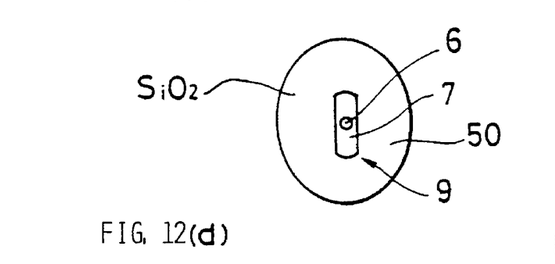
Figure 12E:
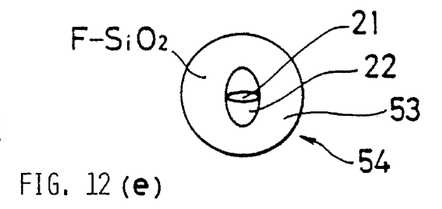
Figure 12F:
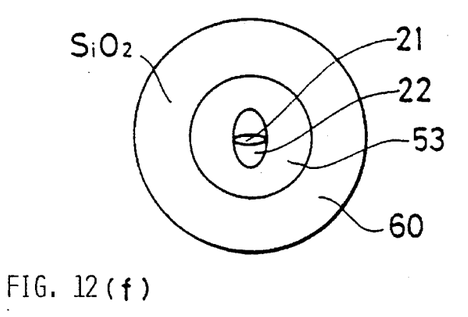
Figure 12G:
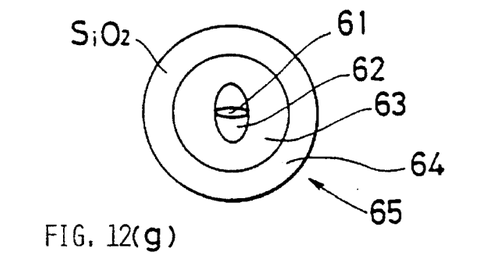

In carrying out the production method, a porous glass 5 comprising a core portion ($GeO_2$—$SiO_2$) 3 and a cladding portion ($SiO_2$) 4 is produced by the VAD process (FIG. 12(a)), and is sintered and vitrified in a fluorine-containing atmosphere (FIG. 12(b)). As a result, the core glass layer 6 becomes $GeO_2$—F—$SiO_2$, whereas the cladding glass layer 7 becomes F—$SiO_2$. The cladding glass layer 7 is a portion to become a first cladding when an elliptic core type of polarization-maintaining maintaining optical fiber is formed.

Then, the thus obtained glass body is mechanically ground and polished on two sides so obtain two side surfaces equally spaced from the center (FIG. 2(c)). An $SiO_2$ porous glass 50 to become a second cladding is externally deposited on the rectangular machined rod 9 thus obtained (FIG. 12 (d)), and is sintered and vitrified in a fluorine-containing gas atmosphere to provide an intermediate cladding glass layer 53 of F—$SiO_2$ glass (FIG. 12(e)). Next, an $SiO_2$ porous glass 60 to become a second cladding is externally deposited on the glass rod body 54 thus obtained (FIG. 12 (f)), and is sintered and vitrified to provide a second cladding glass layer 64 of $SiO_2$ glass, thereby obtaining an elliptic core type polarization-maintaining fiber preform 65 (FIG. 12(g)).

FIG. 11 shows the cross section and the refractive index distribution of the optical fiber preform 34 obtained in the above-mentioned manner. The preform has a four-layer structure comprising a core 61, a first cladding 62, an intermediate cladding 63 and a second cladding 64. The specific refractive index difference of each layer relative to the second cladding 64 ($SiO_2$) was so set that the specific refractive index difference Δ relative to the core 61 was 0.8%, the specific refractive index difference Δ1 relative to the first cladding 62 was 0.3%, and the specific refractive index difference Δ2 relative to the intermediate cladding 63 was 0.15%, by controlling the amounts of $GeO_2$ and F. The ellipticity of the core 61 was 0.9.

Figure 13:
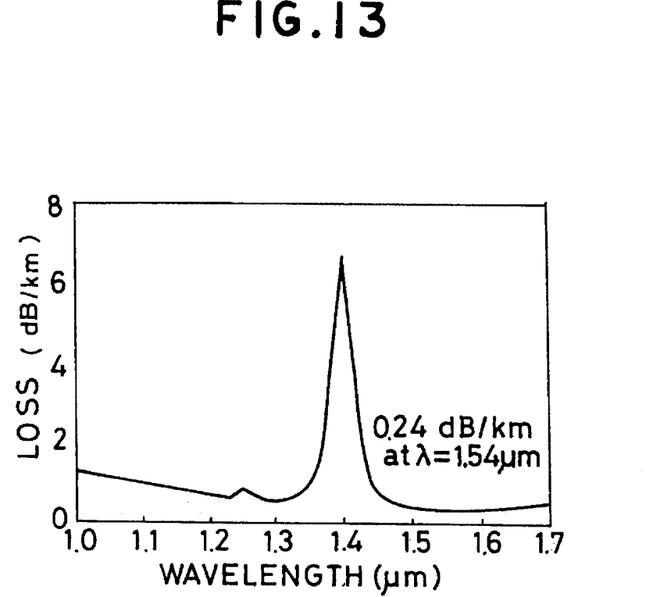
FIG. 13 is a loss-wavelength characteristic chart for a polarization-maintaining optical fiber obtained in the fourth embodiment of the invention.

Further, the optical fiber preform 34 was hot drawn to form a polarization-maintaining optical fiber of 150 μm outside diameter. The optical fiber was sampled at a 1000 m length, and the loss-wavelength characteristic thereof was measured, to obtain the characteristic as shown in FIG. 13. Namely, the optical fiber had a cut-off wavelength of 1.40 μm, a transmission loss of 0.24 dB/km at a wavelength of 1.54 μm, an extinction ratio of −30 dB/km, and a modal birefringence index of $3.0 \times 10^{-4}$.

Figure 14A:
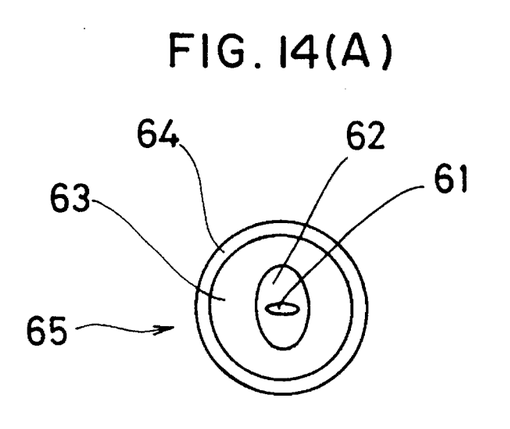
Figure 14B:
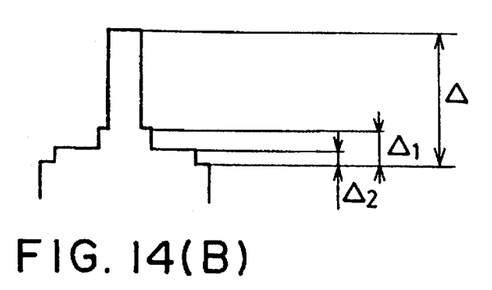
Figure 14C:
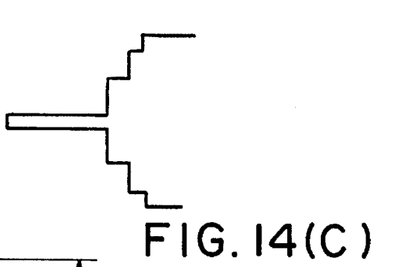

Though fluorine was used as a dopant to change the softening point in the embodiment of FIG. 12, use may be made of $GeO_2$ or $P_2O_5$, which has no absorption peak at the wavelength of 1.54 μm. The refractive index distribution of the optical fiber preform 65 obtained by this modification is, for example, as shown in FIG. 14.

According to fourth embodiment, the second cladding functions as a buffer layer against the internal strain generated at the time of solidification after softening in the drawing step, wherby the internal strain exerted on the core is reduced, and the Rayleigh scattering loss and structural mismatching loss are also lowered. In addition, the presence of the large amount of dopants leads to a lower tension when the preform is drawn at the same drawing temperature as for a conventional preform. Therefore, defects in the preform are covered up, and the strength of the fiber is satisfactorily maintained.

Fifth embodiment:

A method of producing an elliptic core type polarization-maintaining optical fiber which makes it possible to eliminate structural mismatching loss and set an ellipticity of not less than 0.8, will now be explained below.

FIG. 15 outlines the production steps according to the method.

Figure 15A:
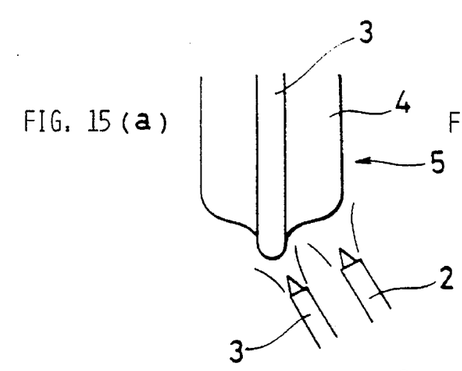
FIGS. 15(a)–(i) are illustrations of the steps for producing an elliptic core type polarization-maintaining optical fiber according to a filth embodiment of the invention.
Figure 15B:
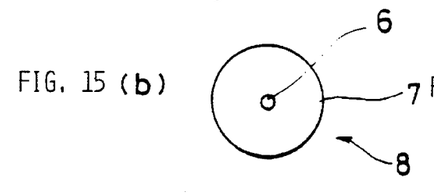

First, a porous glass rod body 5 comprising a core portion ($GeO_2$—$SiO_2$) 3 and a cladding portion ($SiO_2$) 4 is formed by the VAD process, and is sintered in a fluorince atmosphere (FIG. 15(a), (b)). This operation gives a glass rod 8 comprising a core glass layer 6 of $GeO_2$—F—$SiO_2$ and a cladding glass layer 7 of F—$SiO_2$. The outside diameter of the glass rod 8 is 25 mm, the specific refractive index difference $\Delta^+$ of the core glass layer 6 relative to the cladding glass layer 7 is 1%, and the refractive index difference of the cladding relative to the silica support is +0.1%.

Figure 15C:
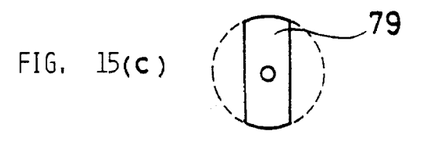

Next, two side portions of the glass rod 8 are ground in parallel to the axial direction to form a machined rod 79 (FIG. 15(c)). The size of the machined rod 79 obtained in this manner was 25 mm×10 mm. The target point of the size obtained by the first grinding was set to achieve a reduction in the ellipticity so that the thickness of the cladding in the minor-axial direction can have a sufficient range for reducing the structural mismatching loss.

Figure 15D:
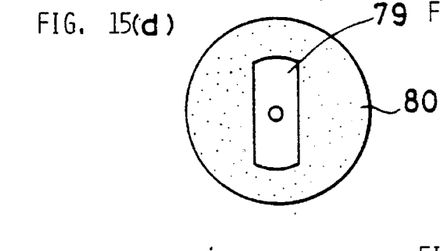
Figure 15E:
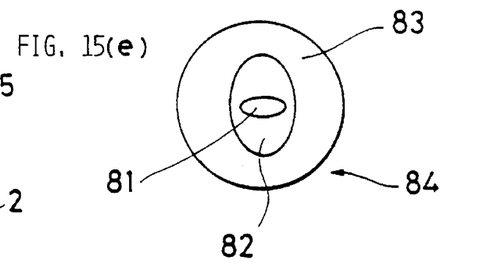
Figure 15F:
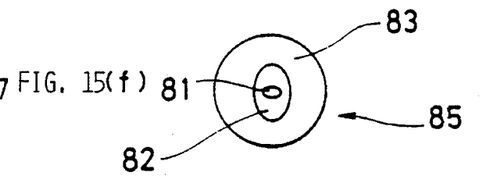

After the grinding, fine silica glass particles 80 to become a support are externally deposited on the machined rod by the VAD process, and sintered (FIG. 15(d), (e)). In this operation, both the core glass layer 81 and the cladding glass layer 82 become elliptic in cross section due to the viscosity difference between the glass rod 79 and the support silica glass 83. In the glass rod body 84 thus sintered, the ellipticity of the core glass layer 81 is about 0.6, and the outside diameter of the rod body is 40 mm. The glass rod body 84 is drawn to be a glass rod body 85 to have an outside diameter of 25 mm (FIG. 15(f)).

Figure 15G:
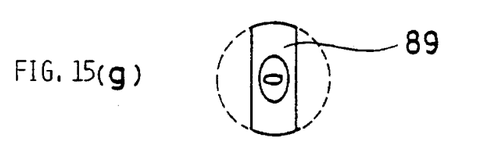
Figure 15H:
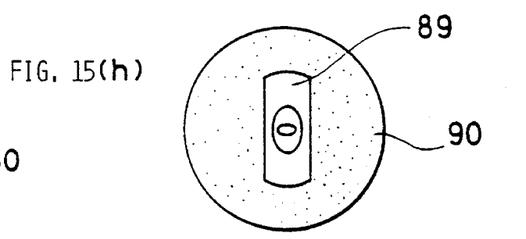
Figure 15I:
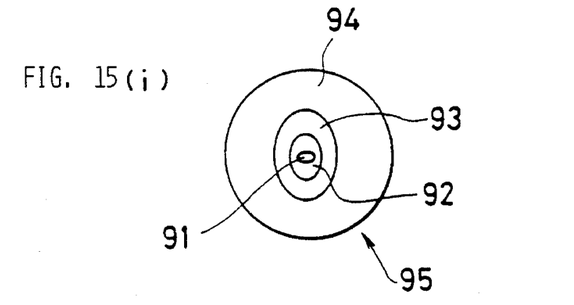

Then, the glass rod body 85 is again ground in parallel, to form a machined rod 89 (FIG. 15(g)). The size of the machined rod 89 obtained in this manner was 25 mm×10 mm. The second grinding is conducted for increasing the ellipticity, which has been lowered by the first grinding. On the machined rod 89 obtained after grinding, fine silica glass particles 90 to become a support are externally deposited by the VAD process, and sintered (FIG. 15(h), (i)). This operation gives, as shown in FIG. 15, an optical fiber preform 95 comprising an elliptic core 91, an elliptic first cladding 92, an elliptic second cladding 93 and a circular support 94.

The optical fiber preform 95 obtained in this manner had an ellipticity of the core 91 of 0.9, and an outside diameter of the preform of 40 mm.

The optical fiber preform 95 was subjected further to outside deposition or adjustment of outside diameter so as to obtain a cut-off wavelength of 1.45 μm. Upon evaluation of the characteristics of the optical fiber thus obtained, the fiber was found to have a loss of 0.25 dB/km and a modal birefringence index of $5 \times 10^{-4}$. The loss value was equal to the loss value of a single-mode optical fiber formed directly from the initial glass rod. Namely, the structural mismatching loss arising from the grinding was reduced to zero, and a modal birefringence index of $5 \times 10^{-4}$ was achieved with the core ellipticity of 0.9.

As has been described above, in the production method according to fifth embodiment, the ellipticity after the first grinding is set low so as to allow the cladding to have a sufficient thickness in the minor axis direction for reducing the structural mismatching loss, and the ellipticity is raised by the second grinding. Therefore, it is possible to obtain an elliptic core type polarization-maintaining optical fiber having a low loss and a high birefringence index. Accordingly, the use of the optical fiber thus obtained gives high promise of enhancing greatly the performance of a rotational angular velocity sensor or a coherent light communication system.

We claim:

1. A method of producing an elliptic core type polarization-maintaining optical fiber which comprises the steps of:

providing a glass rod comprising a core glass layer containing germanium oxide and a fluorine-containing cladding glass layer surrounding the core glass layer, removing two side surface portions of the glass rod by machining along the axial direction of the glass rod to form a machined rod noncircular in cross section, depositing, on the periphery of the machined rod, fine glass particles of a glass composition having a softening point higher than the softening point of the cladding glass layer, sintering the fine glass particles after their deposition on the machined rod to form a support glass layer thereby producing a glass rod of a three-layer structure having a glass core layer elliptical in cross section, a cladding glass layer elliptical in cross-section and the support glass layer, grinding away the support glass layer to completely remove the support glass layer thereby producing a glass rod body circular in cross section, providing a glass layer of the same composition as the cladding glass layer and round in cross section around the periphery of the glass rod body, thereby producing an optical fiber preform with an elliptical core glass layer and a cladding glass layer thereover of a refractive index constant across a transverse section thereof and lower than that of the core glass layer, and drawing the thus obtained optical fiber preform to provide an optical fiber of a single glass layer over an elliptical core glass layer.

2. A method as set forth in claim 1, wherein the core glass layer of the glass rod is doped with F in addition to germanium oxide.

3. A method as set forth in claim 1, wherein the machined rod noncircular in cross section is obtained by grinding mechanically two side surface portions of the glass rod along the axial direction of the glass rod, and subjecting the surfaces of the ground glass rod to polishing and fire-polishing.

4. A method as set forth in claim 1, wherein the machined rod noncircular in cross section is obtained by grinding mechanically two side surface portions of the glass rod, and rounding off the resultant edge portions by chamfering.

5. A method as set forth in claim 1 wherein the glass layer provided around the periphery of the glass rod body and having the same composition as the cladding glass layer is provided by repeating the outside deposition of the fine glass particles by the VAD process and sintering, to obtain the optical fiber preform such that the cut-off wavelength of the optical fiber after drawing is 1.45 μm.

6. A method as set forth in claim 1, wherein the glass rod comprising the core glass layer and the cladding glass layer surrounding the core glass layer is so provided that the ratio of the radial size of the cladding glass layer to the radius of the core glass layer is about 40 and that the cut-off wavelength of the optical fiber after drawing is 1.45 μm.

7. A method of producing an elliptic core type polarization-maintaining optical fiber which comprises the steps of:

providing a glass rod comprising a core glass layer containing germanium oxide and a fluorine-containing cladding glass layer surrounding the core glass layer, removing two side surface portions of the glass rod by machining along the axial direction of the glass rod to form a machined rod noncircular in cross section, depositing, on the periphery of the machined rod, fine glass particles of a glass composition having a softening point higher than the softening point of the cladding glass layer, sintering the fine glass particles after their deposition on the machined rod to form a support glass layer thereby producing a glass rod of a three-layer structure having a glass core layer elliptical in cross section, a cladding glass layer elliptical in cross-section and the support glass layer, corroding away the support glass layer with hydrofluoric acid to completely remove the support glass layer thereby producing a glass rod body circular in cross section, providing a glass layer of the same composition as the cladding glass layer and round in cross section around the periphery of the glass rod body, thereby producing an optical fiber preform with an elliptical core glass layer and a cladding glass layer thereover of a refractive index constant across a transverse section thereof and lower than that of the core glass layer, and drawing the thus obtained optical fiber preform to provide an optical fiber of a single glass layer over an elliptical core glass layer.

8. A method of producing an elliptic core type polarization-maintaining optical fiber which comprises the steps of:

providing a glass rod comprising a core glass layer containing germanium oxide and a fluorine-containing cladding glass layer surrounding the core glass layer, removing two side surface portions of the glass rod by machining along the axial direction of the glass rod to form a machined rod noncircular in cross section, depositing, on the periphery of the machined rod, fine glass particles of a glass composition having a softening point higher than the softening point of the cladding glass layer, sintering the fine glass particles after their deposition on the machined rod to form a support glass layer thereby producing a glass rod of a three-layer structure having a glass core layer elliptical in cross section, a cladding glass layer elliptical in cross-section and the support glass layer, grinding away the support glass layer to completely remove the support glass layer thereby producing a glass rod body circular in cross section, providing a glass layer of the same refractive index and as the cladding glass layer and differing composition from the cladding glass layer and round in cross section around the periphery of the glass rod body, thereby producing an optical fiber preform with an elliptical core glass layer and a cladding glass layer thereover of a refractive index constant across a transverse section thereof and lower than that of the core, and drawing the thus obtained optical fiber preform to provide an optical fiber of a glass layer having a single refractive index over an elliptical core.

* * * * *